United States Patent
Kaufmann et al.

(10) Patent No.: US 6,370,460 B1
(45) Date of Patent: Apr. 9, 2002

(54) STEER-BY-WIRE SYSTEM

(75) Inventors: Timothy Wesley Kaufmann, Frankenmuth; Michael D. Byers, Ypsilanti, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/751,021

(22) Filed: Dec. 28, 2000

Related U.S. Application Data

(63) Continuation of application No. 09/666,497, filed on Sep. 18, 2000.
(60) Provisional application No. 60/154,453, filed on Sep. 17, 1999.

(51) Int. Cl.[7] .............................. B62D 1/00; B62D 5/00; B62D 6/00; B62D 101/00; B62D 113/00; B62D 119/00; G05D 1/00; G06F 7/00; G06F 17/00; G06F 19/00
(52) U.S. Cl. .............................. 701/41; 701/42; 701/43; 701/44; 701/33; 180/402; 180/403; 180/444-449; 340/465; 340/466; 340/576; 33/203; 33/203.18
(58) Field of Search .............................. 701/41, 42, 43, 701/44, 33; 340/466, 465, 576; 33/203, 203.18; 180/402, 403, 444, 445, 446–449

(56) References Cited

U.S. PATENT DOCUMENTS

| | | | |
|---|---|---|---|
| 5,251,135 A | 10/1993 | Serizawa et al. | ............ 180/79.1 |
| 5,347,458 A * | 9/1994 | Serizawa et al. | ...... 364/424.05 |
| 5,576,957 A | 11/1996 | Asanuma et al. | |
| 5,653,304 A | 8/1997 | Renfroe | |
| 5,668,722 A | 9/1997 | Kaufmann et al. | ............ 701/41 |
| 5,740,040 A | 4/1998 | Kifuku et al. | ............... 180/446 |
| 5,828,972 A * | 10/1998 | Asanuma et al. | .............. 701/41 |
| 5,925,083 A | 7/1999 | Ackermann | |
| 6,018,691 A | 1/2000 | Yamamoto et al. | |
| 6,097,286 A * | 8/2000 | Discenzo | ..................... 340/465 |
| 6,098,926 A * | 8/2000 | Perisho, Jr. et al. | ........... 33/203 |
| 6,102,151 A | 9/2000 | Shimizu et al. | ............. 180/446 |
| 6,176,341 B1 * | 1/2001 | Ansari | ......................... 180/402 |
| 6,179,394 B1 * | 1/2001 | Browalski et al. | ........... 303/146 |
| 6,208,923 B1 * | 5/2001 | Hommel | ...................... 701/42 |

FOREIGN PATENT DOCUMENTS

| | | | |
|---|---|---|---|
| EP | 88101474.0 | | 2/1988 |
| GB | 2341588 A | * | 3/2000 |
| JP | 360259570 A | * | 6/1984 |
| JP | 1115778 | | 5/1989 |
| JP | 08034353 A | * | 9/1994 |

* cited by examiner

*Primary Examiner*—William A. Cuchlinski, Jr.
*Assistant Examiner*—Ronnie Mancho
(74) *Attorney, Agent, or Firm*—Edmund P. Anderson

(57) ABSTRACT

A steer by wire control system having a steering wheel unit responsive to a steering wheel torque command and a road wheel unit responsive to a road wheel unit command is disclosed. A master control unit may be employed to perform processing as necessary. A method for steering a vehicle including receiving a tie-rod force signal, a road wheel position signal, a vehicle speed signal, a steering wheel position signal, and a feedback torque signal. Combining these signals to generate the steering wheel torque command signal and road wheel command signal to provide the operator with tactile feedback, while road wheel command signals are sent to road wheel units to provide steering direction. An Ackerman correction unit may also used to correct the left and right road wheel positions to track about a common center.

81 Claims, 7 Drawing Sheets

STEER-BY-WIRE SYSTEM

CROSS-REFERENCE TO RELATED APPLICATIONS

This application is a continuation of, U.S. patent application Ser. No. 09/666,497, filed Sep. 18, 2000, which claims the benefit of U.S. provisional patent application No. 60/154,453, filed Sep. 17, 1999, both of which are incorporated by reference herein in their entirety.

FIELD OF THE INVENTION

This disclosure relates to steer-by-wire vehicle control systems.

BACKGROUND OF THE INVENTION

Steering equipment for assisting a driver to steer an automobile is well known in the art. In conventional steering assemblies, the operator controls the direction of the vehicle with the aid of a steering wheel. This wheel is mechanically connected, usually through a gear assembly to the road wheels. To aid the operator, many systems utilize an auxiliary system to generate a force that is transmitted to a steering gear assembly. The additional force reduces the effort required by the operator in changing the direction of the vehicle. Typically, this auxiliary force is generated by either a hydraulic drive or an electric motor.

Because the steering wheel is connected directly to the road wheels, the resulting mechanical assembly that provides the connection can be quite complicated and expensive to produce. The one advantage in having a direct connection is that the operator receives tactile feedback through the steering wheel. For example, if the vehicle changes directions while it is moving, the operator will feel resistance in the steering wheel.

Therefore, is it considered advantageous to provide a steering control system that is less expensive than a traditional mechanical system while still providing the tactile feedback to the operator.

BRIEF SUMMARY OF THE INVENTION

The present invention is directed to a control system and method, which provides a vehicle operator with an electronic steering or steer-by-wire control for a vehicle. The steer-by-wire control system comprises a road wheel unit and a steering wheel unit that operate together to provide steering control for the vehicle operator. A master control unit may be employed to support performing the desired signal processing. Signals from sensors in the road wheel unit, steering wheel unit, and vehicle speed are used to calculate road wheel command signals to control the direction of the vehicle and steering wheel torque commands to provide tactile feedback to the vehicle operator. An Ackerman correction may be employed to adjust the left and right road wheel angles correcting for errors in the steering geometry to ensure that the wheels will track about a common turn center.

DETAILED DESCRIPTION OF THE INVENTION

Figure 1:
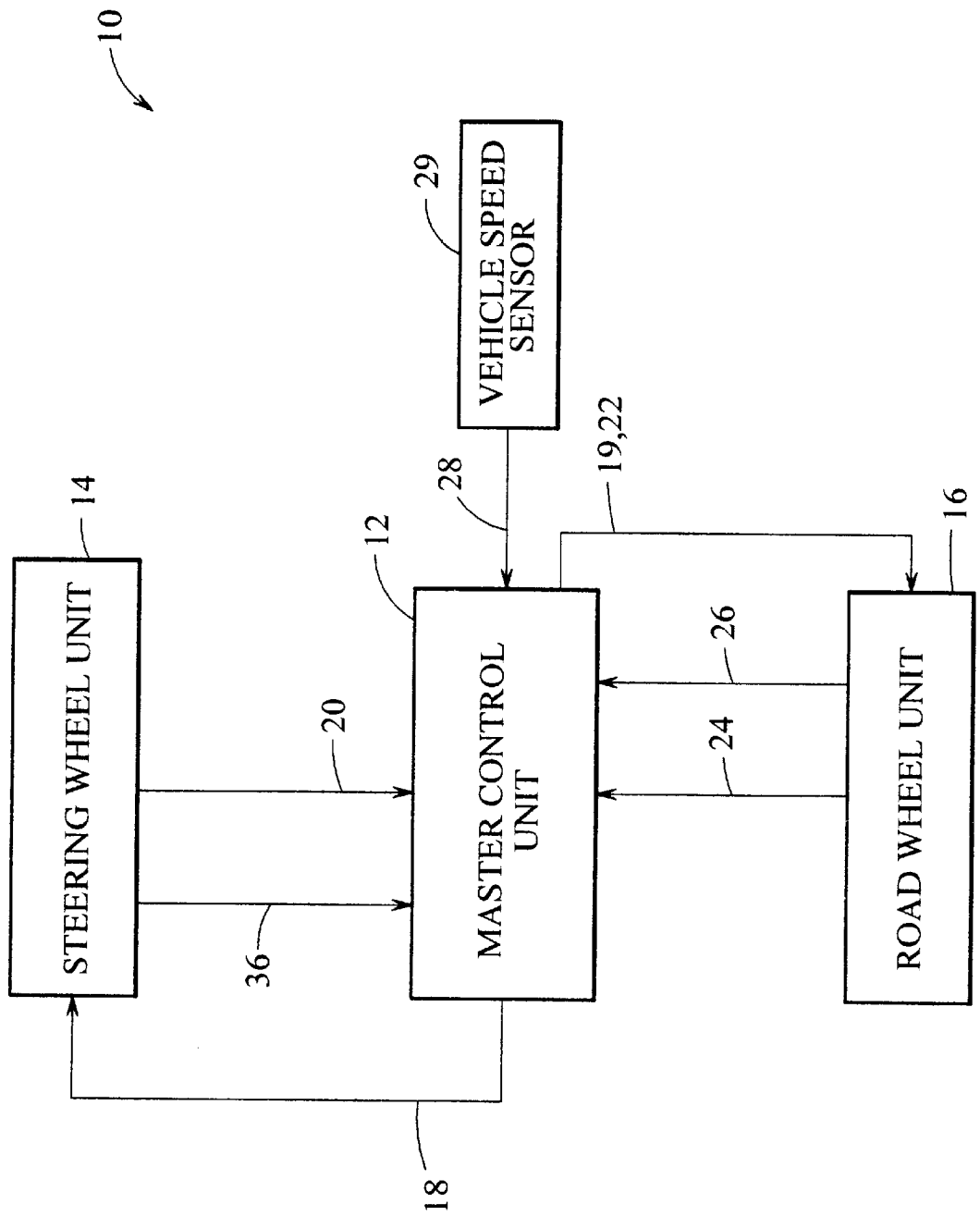
FIG. 1 is a block diagram illustrating a steering control system in one embodiment of the present invention.

Referring to FIG. 1, there is shown an automobile steering control system. The steer-by-wire control system 10 comprises several closed loop subsystems that work together to provide an operator with control over the direction of the vehicle and to provide the operator with desirable tactile feedback in response to operator commands and system conditions.

The present invention may be utilized in various types of vehicles employing electronic steering or steer-by-wire systems. A preferred embodiment of the invention, by way of illustration is described herein as it may be applied to an automobile employing a steer-by-wire system. While a preferred embodiment is shown and described by illustration and reference to an automobile steering system, it will be appreciated by those skilled in the art that the invention is not limited to the automobiles alone, and may be applied to all vehicles employing electronic steering systems or steer by wire systems.

A steering wheel unit 14 detects the position and movement of a steering wheel (not shown) and sends a steering wheel position signal 20 to the master control unit 12. The master control unit 12 combines the information of the steering wheel position 20, a feedback torque sensor signal 36, with a vehicle speed signal 28 from a vehicle speed sensor 29 and tie-rod force signals 24, 26 from a road wheel unit 16. Using these input signals, the master control unit 12 produces road wheel command signals 19, 22 (one for a left and right road wheel respectively) that are sent to the road wheel unit 16. In addition, a steering wheel torque command signal 18 is sent to the steering wheel unit 14.

It will be appreciated, that the steering wheel unit 14, master control unit 12, and road wheel unit 16 are described for illustrative purposes. The processing performed throughout the system may be distributed in a variety of manners. For example, distributing the processing performed in the master control unit 12 among the other processes employed may eliminate the need for such a component or process as described. Each of the major systems may have additional functionality that will be described in more detail herein as well as include functionality and processing ancillary to the disclosed invention. As used herein, signal connections may physically take any form capable of transferring a signal, including electrical, optical, or radio.

Figure 2:
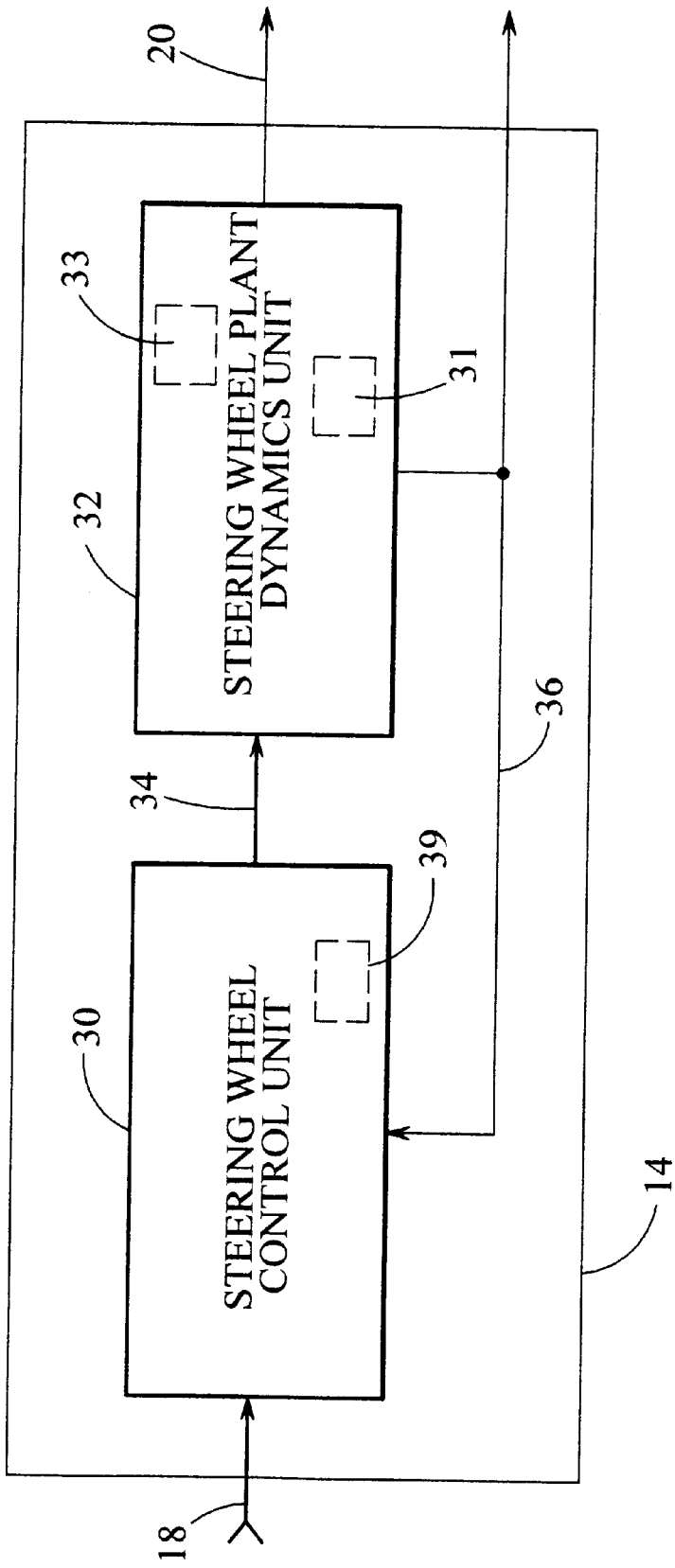
FIG. 2 is a block diagram of the steering wheel unit shown in FIG. 1.

Referring to FIG. 2, the steering wheel unit 14 is a closed loop control system that uses steering wheel torque as the feedback signal. The steering wheel torque command signal 18 is received from the master control unit 12 (FIG. 1) into the steering wheel control unit 30 where the signal is compared to the feedback torque signal 36. For example, a simple method of comparison is simply to subtract one signal from another. A zero result indicates that the desired torque is being applied. Generally, the steering wheel unit 14 will have a compliant torque sensor (such as a T-bar) with two masses at each end (motor inertia and steering wheel inertia). A frequency-based compensator 39 is employed in the steering wheel control unit 30 to maintain stability of the steering wheel plant dynamics unit 32. The frequency-based compensator 39 is used to provide stability of the steering wheel control system at sufficient gains to maintain bandwidth in the area of 10 Hz. In the case, of each local loop (hand wheel and road wheel systems) the bandwidth of each affects the stability of the overall system. If either road wheel or hand wheel have low bandwidth, over all stability is reduced and compensation on a higher level is required. A torque command signal 34 is then passed to the plant dynamics unit 32 as needed to comply with the steering wheel torque command signal 18. The steering wheel plant dynamics unit 32 contains the necessary elements to provide a reaction torque to the operator as well as a torque sensor 31 to provide the feedback torque signal 36 to the control unit 30 as well to the master control unit 12 (FIG. 1), and a steering wheel position sensor 33 that produces and sends a steering wheel position signal 20. Generally, reaction torque will be imparted to the operator by an electric motor coupled either to the steering column or to the rack. Preferred reaction torque motors are those with reduced torque ripple, such as are described in detail in commonly assigned U.S. patent Ser. No. 09/656,116, entitled TORQUE RIPPLE FREE ELECTRIC POWER STEERING, filed Sep. 6, 2000, the disclosures of which are incorporated by reference herein in their entirety. It is noteworthy to appreciate that a torque ripple free motor is desirable, but not required for this invention. Either type will work with the invention as disclosed and described. The distinction between the two being that with a torque ripple free motor, the steering wheel system 14 may not need to be a closed loop system on torque, provided the steering wheel system 14 employs motor control in current mode versus voltage mode. Again, current control of the reaction torque motor of the steering wheel system 14 may be desired to minimize damping, though it is not required.

Figure 3:
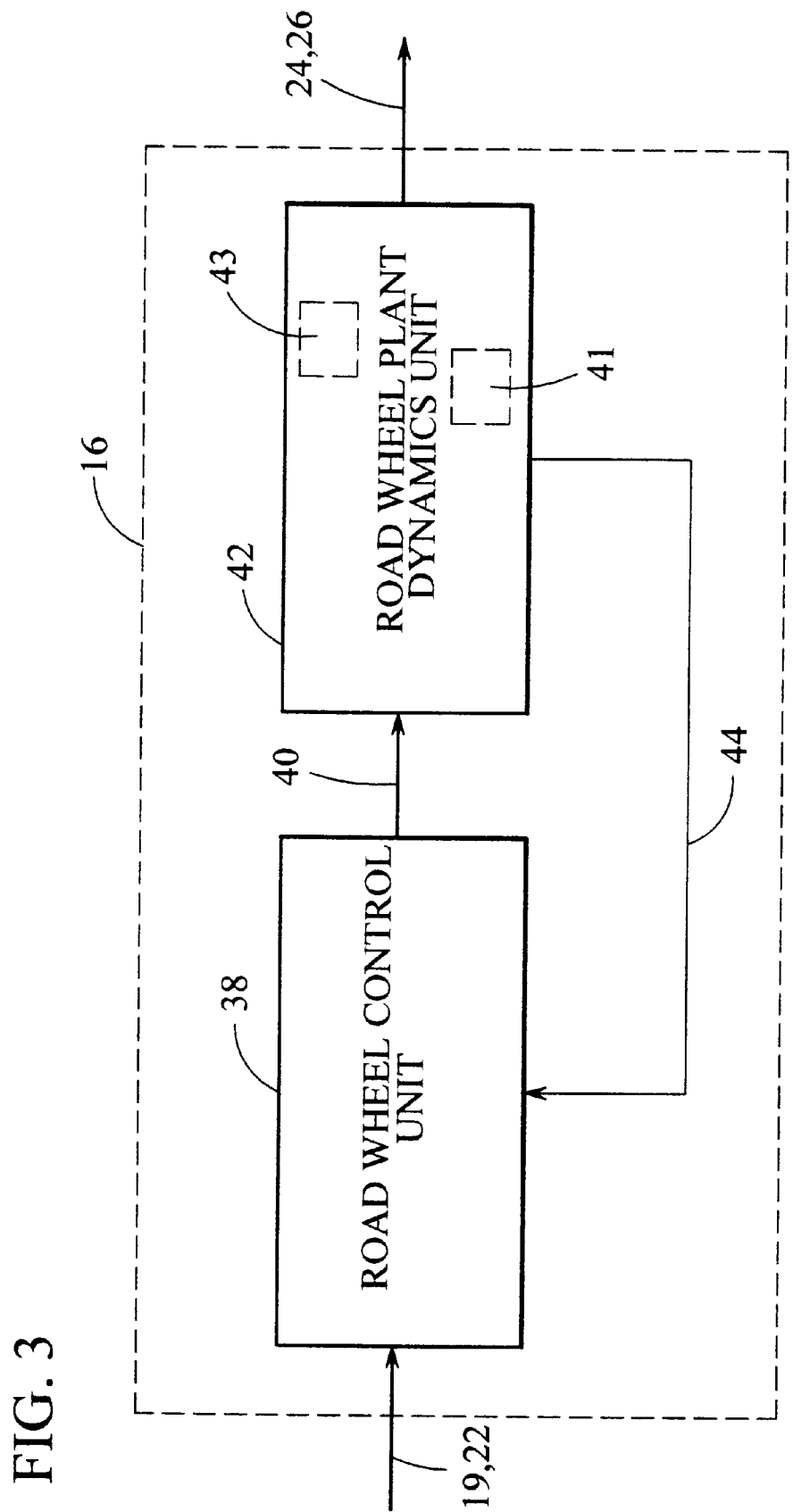
FIG. 3 is a block diagram of the road wheel unit shown in FIG. 1.

Referring to FIG. 3, the road wheel unit 16, like the steering wheel unit, is also a closed loop control system that uses road wheel position as a feedback signal. There is typically, a road wheel unit for each steerable wheel, though only one is shown in the drawing. In an embodiment, within the road wheel unit 16, the road wheel command signal (19 for the left wheel, 22 for the right) is received from the master control unit 12 and compared with a road wheel position signal 44 within the road wheel control unit 38. A position command signal 40 is sent to the road wheel plant dynamics unit 42. The road wheel plant dynamics unit 42 contains the necessary elements to control the position of the vehicle wheels as well as a road wheel position sensor 41 to provide road wheel position signal 44 indicative of the road wheel position. It will be appreciated that the road wheel command could be dependent upon additional sensors and functions. The road wheel system includes drive motors, which may be operated in either current or voltage mode, provided, in each case, sufficient stability margins are designed into the road wheel system 16 with local loop (road wheel system) frequency based compensators. In an embodiment, a bandwidth of the order of 10 Hz has been shown to be desirable in either case. In addition, there may also be a desire to command each road wheel unit 16 with a different command as required to obtain desired performance. For example, the commands may differ when cornering a vehicle to enhance individual road wheel tracking of the desired radius. A tie-rod sensor 43 is also located within plant dynamics unit 42. The tie-rod sensor 43 detects and also measures the forces on the tie-rods and sends a signal representative of the measured forces to the master control unit 12 (FIG. 1). In a preferred embodiment, a left, and a right tie-rod force sensor 43a, 43b (FIG.4) measure and transmit signals (24 for one wheel, 26 for the other) representative of the left and right road wheel tie-rod forces respectively.

Figure 4:
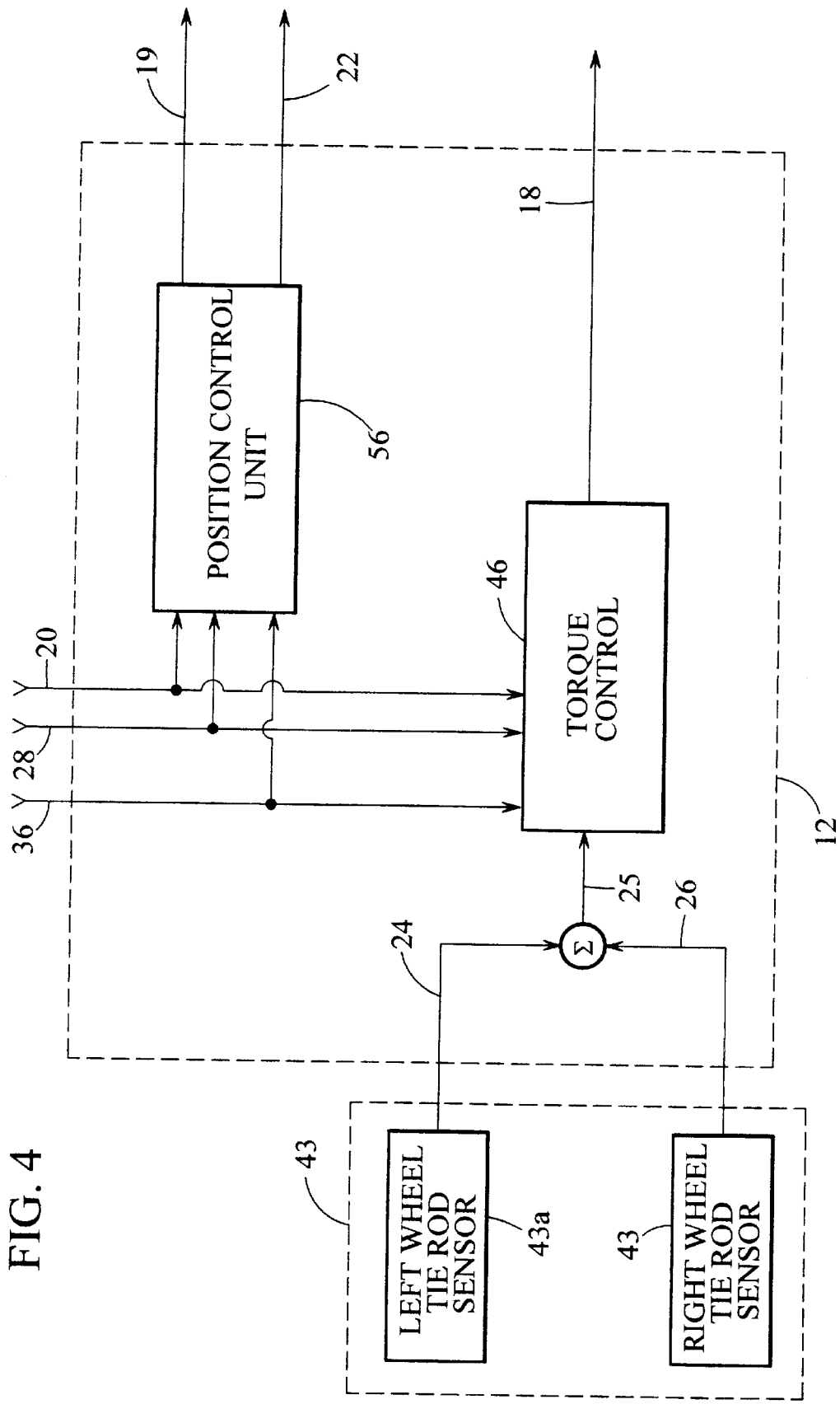
FIG. 4 is a block diagram of the master control unit shown in FIG. 1.

FIG. 4 shows a more detailed view of the master control unit 12. The master control unit 12 receives the steering wheel position signal 20 and torque sensor signal 36 from the steering wheel unit 14. This steering wheel position signal 20, feedback torque sensor signal 36 and vehicle speed signal 28 are utilized to generate and output the road wheel position command signals 19, 22 within the position control unit 56.

As discussed above, the road wheel plant dynamics unit 42 (FIG. 3) includes tie-rod sensors 43a and 43b generating tie-rod force signals 24 and 26.These signals are sent to the master control unit 12 and combined to generate a composite force signal 25. It is noteworthy to appreciate that each of the tie-rod force signals 24 and 26 should be associated with an appropriate sign, namely to emulate or identify the force that would be observed if both tie rods were connected, as in a conventional rack based steering system. For example, in a turn one wheel turns inward toward the vehicle while the other turns outward away from the vehicle. In this state, the forces are opposite on each tie rod, one in compression and the other in tension. So, to properly sense the composite tie rod force correctly the sum the magnitude of each and provide proper sign information corresponding to the direction of the turn. Likewise, the same operation may be accomplished by subtraction of each tie rod force signal 24, and 26 from one another employing an opposite sign sense (compression positive, tension negative). The composite force signal 25 is sent to the active damping process 45 (FIG. 5) of the torque control unit 46. In an embodiment, the combination disclosed is a simple summation, however, it will be appreciated that the combination may be more sophisticated and could in fact include additional sensor or parameter. For example, while the embodiment disclosed addresses utilization of two tie-rod force sensors 43a and 43b, additional sensor might be employed.

Figure 5:
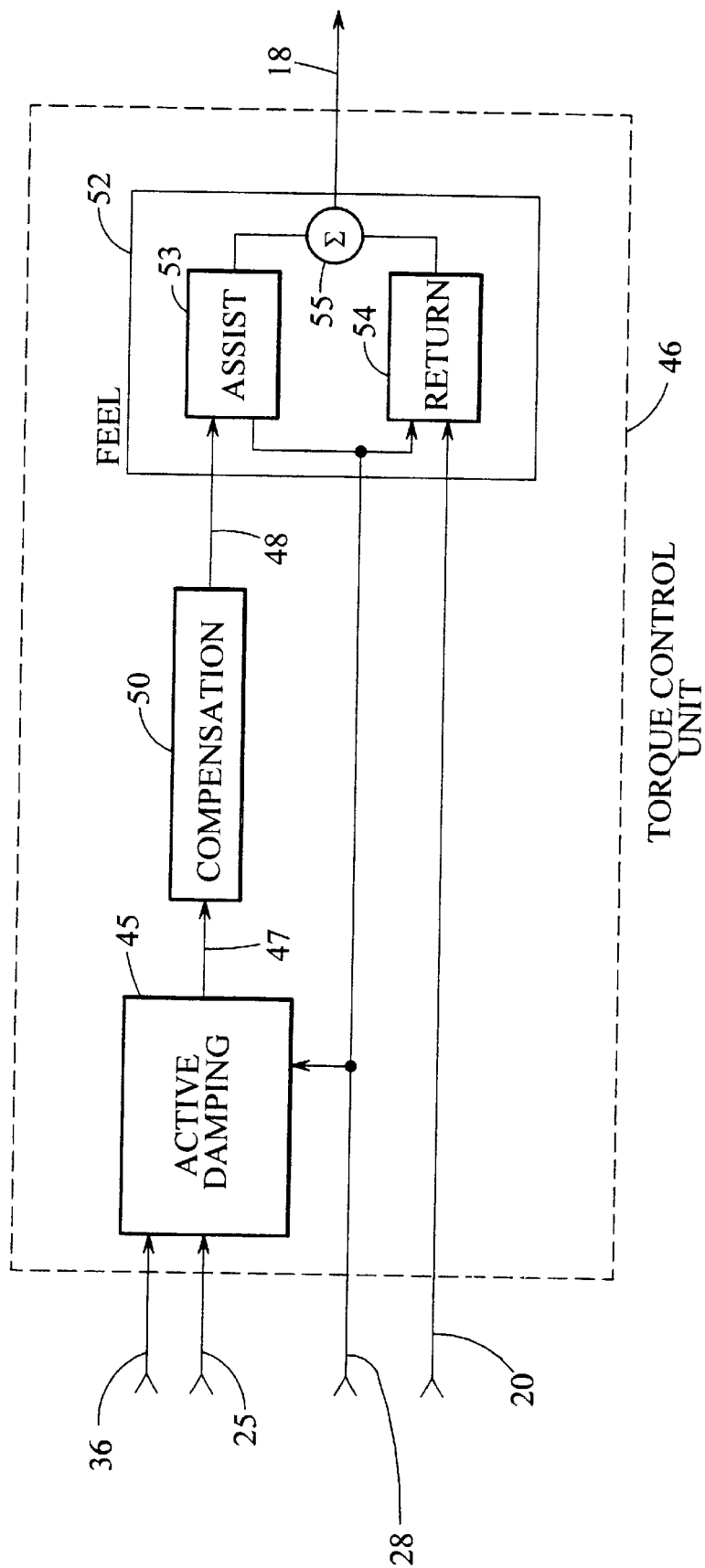
FIG. 5 is a block diagram of the torque control unit shown in FIG. 4.

Referring to FIG. 5, the torque control unit 46 performs several processes for generating the steering wheel torque command signal 18. These processes utilize as inputs; the composite force signal 25, vehicle speed 28, the feedback torque sensor signal 36, and the steering wheel position signal 20, to generate the steering wheel torque command signal 18 as an output. The first process is the active damping process 45, which uses the vehicle speed 28, the feedback torque sensor signal 36, and the steering wheel position signal 20, to generate a desired damping command which is compared with the composite force signal 25 to yield a damping torque command signal 47. The active damping process 45 provides the opportunity to control the damping of the steer-by-wire-system 10 dynamically as a function of vehicle operational parameters. In an embodiment, the active damping process generates an increasing desired damping command signal with increasing vehicle speed 28, decreasing steering wheel torque as detected by the feedback torque sensor signal 36, and increasing rate of change of steering wheel position signal 20. A damping torque command signal is sent to the compensation process 50 of the torque control unit 46.

The compensation process 50 includes frequency based filtering to manipulate the spectral content of the damping torque command signal 47 to ensure steer-by-wire system loop stability. Moreover, the compensation process 50 is configured to maintain system stability in the event the bandwidth of the control loops within the steering wheel unit 14 or road wheel unit 16 decrease. Finally, the compensation process 50 manipulates the damping torque command signal to modify the spectral content of sensed road feedback to the vehicle operator. The compensation process 50 outputs the compensated torque command signal 48 to the feel process 52.

Moving now to the feel process 52, which includes two sub-processes for generating the steering wheel torque command signal 18. The first sub-processes being the assist 53, which generates an assist torque command signal as a function of vehicle speed. In a preferred embodiment, the assist sub-process 53 indexes the composite tie-rod force signal initiated compensated torque command signal into a set of one or more torque look-up tables yielding an assist torque command. Where more than one look-up table is used, the outputs are preferably blended based upon a ratio dependent upon the vehicle speed signal 28. For example, two lookup tables might be used, one for low speeds, and one for highway speeds. As the vehicle speed signal increases, the table for highway speeds becomes increasingly dominant in the blend over the table for low speeds. Generally, it may be desirable for the assist process 53 to provide increasing assist torque as a function of vehicle speed increases. Conventional systems, such as electric power steering systems use the method of reducing the steering assisting force to allow the driver to feel more of the tire or steering load. However, in a steer by wire system there is no direct mechanical link to the vehicle road wheels. Therefore, the commanded torque to the driver should actually be increased to cause the driver to feel more tire or steering load.

The second sub-process employed in the feel process 52 is the return sub-process 54. The return sub-process 54 generates a return to center torque command to drive the steering wheel and the steer-by-wire system 10 to neutral or center under particular operating conditions based upon the current steering wheel position signal 20 and the vehicle speed signal 28. Similar to the assist sub-process 53, the return sub-process 54 employs lookup tables, which in this case are indexed by the steering wheel position signal 20. In a preferred embodiment, the return sub-process 54 indexes the steering wheel position signal into a set of one or more torque look-up tables yielding a return to center torque command. Where more than one look-up table is used, the outputs are preferably blended based upon a ratio dependent upon the vehicle speed signal 28. For example, two lookup tables might be used, one for low speeds, and one for highway speeds. As the vehicle speed signal increases, the table for highway speeds becomes increasingly dominant in the blend over the table for low speeds. Generally, it may be desirable for the return sub-process 54 to provide increasing return torque as a function of vehicle speed increases. The final processing of the feel 52 process is to combine the assist torque command and the return to center torque command thereby generating the steering wheel torque command signal 18. In an embodiment, the combination is achieved via a summation at summer 55.

It will be appreciated that while the disclosed embodiments refer to a configuration utilizing look-up tables in implementation, various alternatives will be apparent. For example, the processes described above could employ in addition to or in lieu of look-up tables direct algorithms, gain or parameter scheduling or various other methodologies, which may facilitate execution of the desired functions.

Figure 6:
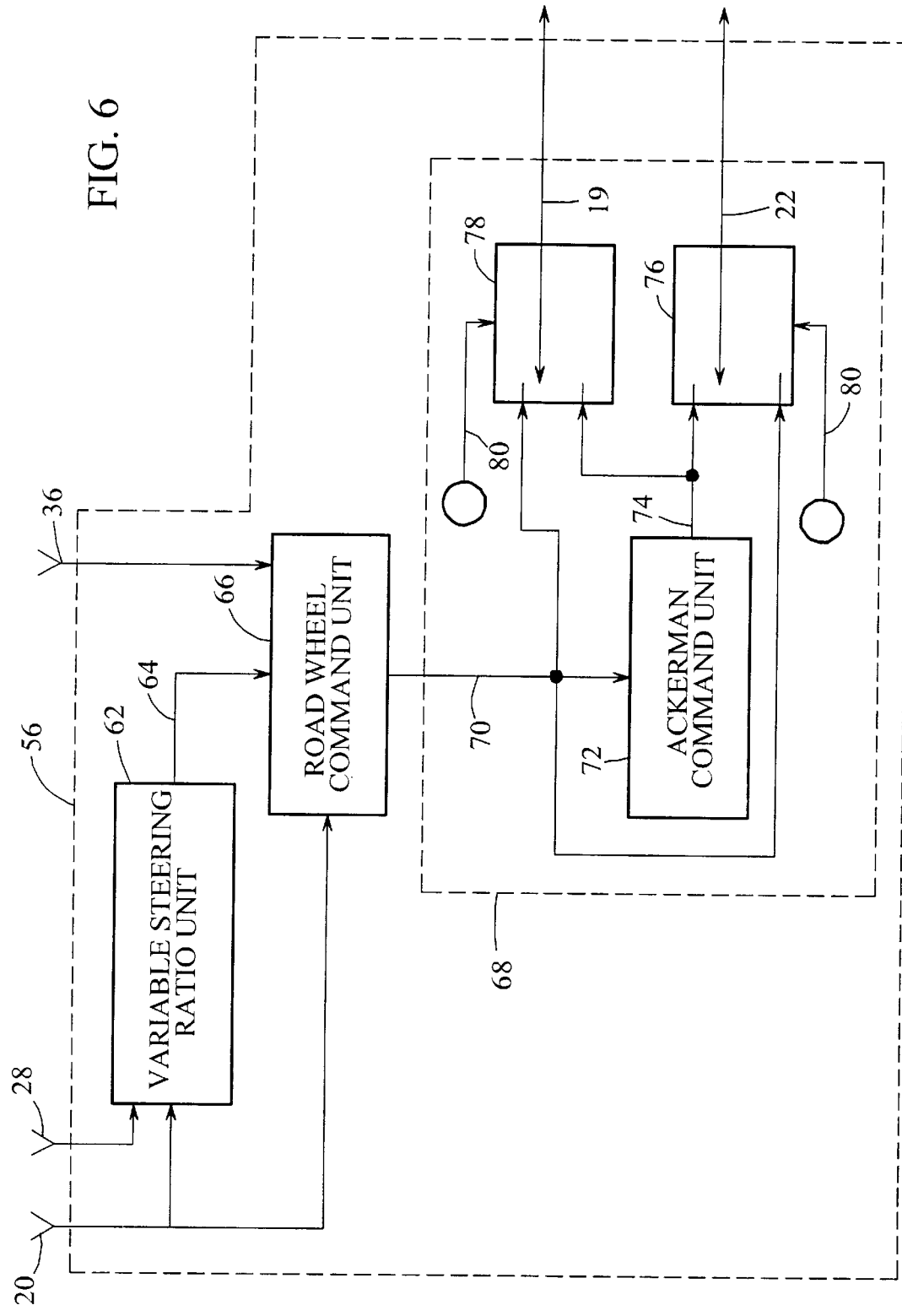
FIG. 6 is a block diagram of the position control unit shown in FIG. 4.
Figure 7:
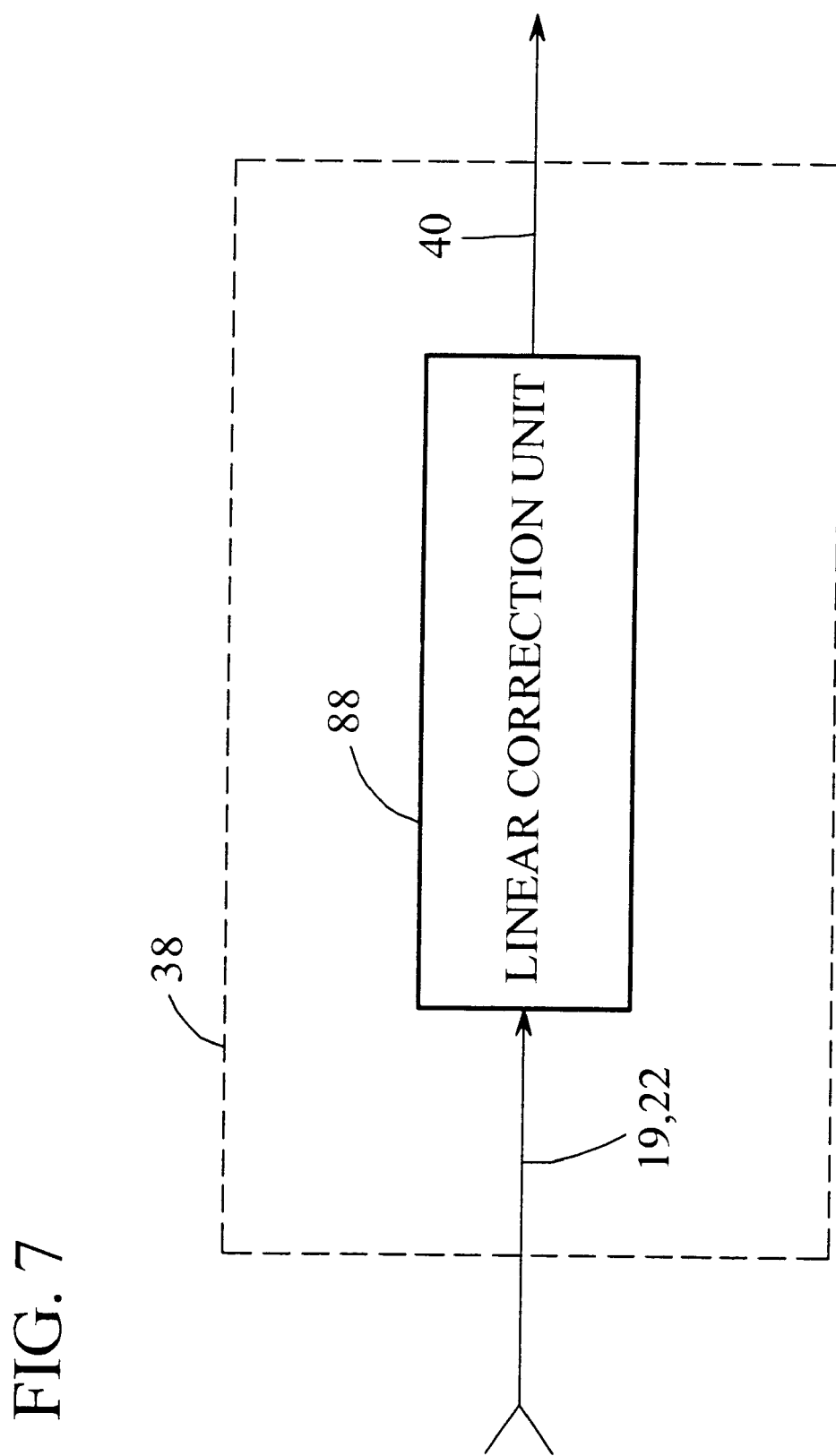
FIG. 7 is a block diagram of the linear correction unit of the road wheel control unit shown in FIG. 3.

Referring now to FIGS. 6 and 7, the position control unit 56 has several sub components that are used in the calculation of the left and right hand road wheel command signals 19, 22. The variable steering ratio unit 62 receives the steering wheel position signal 20. The variable steering ratio unit 62 also receives the vehicle speed signal 28. The steering wheel position signal 20, and the vehicle speed signal 28 are used as inputs to a three dimensional look-up table to generate a variable steering ratio signal 64. The resulting variable steering ratio signal 64 is passed to the road wheel command unit 66.

The road wheel command unit 66 provides theta correction, that is, to correct the commanded road wheel position to reflect the actual position of the steering column correctly. This is needed for situations where the reaction torque motor of the steering wheel unit 14 moves to provide a reaction torque to the driver in response to a movement of the road wheels. However, the driver does not necessarily permit the steering wheel to turn, though he feels the reaction torque. The feedback torque signal 36 provides an effective, relative position measurement under the above-mentioned conditions. This relative position measurement is used by the road wheel command unit 66 to account for the motor to wheel difference and compensate the steering wheel position signal 20 accordingly. The effect of the road wheels moving without the steering column moving is undesirable so a theta correction is provided and a theta-corrected road wheel command signal 70 is generated. It is noteworthy to further understand that theta correction is only needed if the steering wheel position sensor 33 for the steering wheel is located such that a compliant member (t-bar or compliant torque sensor 31) in the actuator implementation of the steering wheel plant dynamics unit 32 is between the steering wheel position sensor 33 and driver input at the steering wheel.

The theta-corrected road wheel command signal 70 passes from the road wheel command unit 66 to the Ackerman correction unit 68. The Ackerman correction unit 68 adjusts the road wheel angles to correct for errors in the steering geometry. This correction enables each wheel to be steered in such a manner as to negotiate a curve along its natural rolling path. Though the Ackerman correction unit 68 is optional, it is preferred because under normal turning conditions, the inner wheel tracks a smaller radius than the outer wheel to track a common turn center, thus the inner wheel needs to be steered at a greater angle.

In an embodiment, an Ackerman command signal 74 is generated in the Ackerman command unit 72 based upon the theta-corrected road wheel command signal 70. The Ackerman command signal 74 is sent to a left road wheel switch 78 and a right road wheel switch 76. The left and right road wheel switches 76, 78 operate to select either the Ackerman command signal 74 or the theta-corrected road wheel command signal 70 in response to a sign signal 80 representative of the sign of the theta-corrected road wheel signal 70 to determine the left and right road wheel signals. Thereby, the Ackerman correction is applied to the appropriate wheel in a particular vehicle turn. The left 19 and right 22 road wheel signals are then passed back to the road wheel unit 16.

It is important to note that all the examples provided herein relate to a vehicle having two steerable wheels. However, this type of system could be easily extended to a vehicle that requires one or more wheels to be steered simultaneously by adding additional road wheel units 16.

The left 19 and right 22 road wheel signals are typically representative of the desired road wheel angle. To use this information effectively, the road wheel plant dynamics unit 42 may need this information in a signal representative of a linear value. Accordingly, the road wheel control unit 38 (from FIG. 3) may contain additional functionality as shown in FIG. 6.

Referring to FIG. 7, there is shown the road wheel control unit 38 wherein a linear correction unit 88 transforms the road wheel signals 19, 22 into a linear travel signal that is representative of the linear value required for the left or right wheel, respectively. The linear travel signal is passed to the plant dynamics unit 42 (see FIG. 3) as the position command signal 40. The linear correction unit 88 uses the given steering geometry of the vehicle to calculate a linear position in order to attain a desired rotational position. It is contemplated that these calculations may be compiled into a lookup table or the like, to optimize controller performance.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A steer-by-wire control system comprising:
    a road wheel unit responsive to a road wheel command signal for steering a vehicle;
    a steering wheel unit responsive to a steering wheel torque command signal;
    a vehicle speed sensor for producing a vehicle speed signal;
    a master control unit electrically configured and connected to said vehicle speed sensor, said steering wheel unit, and said road wheel unit;
    wherein said road wheel unit includes a road wheel position sensor and a tie-rod sensor to produce and transmit a tie-rod force signal;
    wherein said steering wheel unit includes a steering wheel position sensor to produce and transmit a steering wheel position signal and a torque sensor to produce and transmit a feedback torque sensor signal;
    said master control unit includes a position control unit that calculates said road wheel command signal in response to said vehicle speed signal, said feedback torque sensor signal and said steering wheel position signal;
    said master control unit generates a composite tie-rod force signal; and
    said master control unit includes a torque control unit that calculates and produces said steering wheel torque command signal in response to said composite tie-rod force signal, said feedback torque sensor signal, said steering wheel position signal and said vehicle speed signal.

2. The steer-by-wire control system of claim 1 wherein said torque control unit includes an active damping process wherein a desired damping command is generated responsive to said feedback torque sensor signal, said steering wheel position signal, and said vehicle speed signal, which is compared with said composite tie-rod force signal to generate a damping torque command signal.

3. The steer-by-wire control system of claim 2 wherein said desired damping command is responsive to a time rate of change of said steering wheel position signal and modified by the feedback torque sensor signal and vehicle speed signal.

4. The steer-by-wire control system of claim 2 wherein said torque control unit implements a compensation process employing frequency based filters to configure spectral content of said damping torque command signal thereby generating a compensated torque command signal.

5. The steer-by-wire control system of claim 4 wherein said compensation process includes frequency based filters configured to modify the spectral content of sensed road feedback to an operator.

6. The steer-by-wire control system of claim 4 wherein said compensation process includes frequency based filters configured to maintain stability of said steer-by-wire control system.

7. The steer-by-wire control system of claim 6 wherein said compensation process includes frequency based filters configured to modify the spectral content of sensed road feedback to an operator.

8. The steer-by-wire control system of claim 4 wherein said torque control unit further implements a feel process which generates said steering wheel torque command signal in response to combining an assist torque command and a return torque command.

9. The steer-by-wire control system of claim 8 wherein said combining is a summation.

10. The steer-by-wire control system of claim 8 wherein said torque control unit further implements a feel process comprising an assist sub-process responsive to said compensated torque command signal and said vehicle speed signal, which generates said assist torque command and a return sub-process responsive to said steering wheel position signal and said vehicle speed signal, which generates said return torque command.

11. The steer-by-wire control system of claim 10 wherein said assist sub-process indexes said compensated torque command signal to at least one assist look-up table and blends an output thereof to generate a blended value of said assist torque command.

12. The steer-by-wire control system of claim 11 wherein said outputs of said at least one assist look-up table are blended in a ratio dependent upon said vehicle speed signal.

13. The steer-by-wire control system of claim 10 wherein said return sub-process indexes said steering wheel position signal to at least one return look-up table and blends an output thereof to generate said return torque command.

14. The steer-by-wire control system of claim 13 wherein said outputs of said at least one return look-up table are blended in a ratio dependent upon said vehicle speed signal.

15. The steer-by-wire control system of claim 1 wherein said position control unit calculates and produces a variable steering ratio signal in response to said steering wheel position signal, said feedback torque sensor signal, and said vehicle speed signal.

16. The steer-by-wire control system of claim 15 wherein said variable steering ratio signal is calculated using said steering wheel position signal and said vehicle speed signal as inputs to a steering ratio look-up table.

17. The steer-by-wire control system of claim 16 wherein said position control unit further comprises a road wheel command unit that calculates a theta correction and generates a theta corrected road wheel command signal from said variable steering ratio signal, said feedback torque sensor signal, and said steering wheel position signal.

18. The steer-by-wire control system of claim 15 wherein said position control unit calculates and produces a road wheel command signal in response to said steering wheel position signal, said feedback torque sensor signal, and said variable steering ratio signal.

19. The steer-by-wire control system of claim 15 wherein said position control unit further includes an Ackerman correction unit for producing a left road wheel signal and a right road wheel signal in response to said road wheel command signal.

20. The steer-by-wire control system of claim 19 wherein said road wheel unit includes a linear correction unit for calculating and producing a position command signal in response to a road wheel command signal.

21. A method for steering a vehicle comprising:
receiving a tie-rod force signal and a road wheel position signal;
receiving a vehicle speed signal;
receiving a steering wheel position signal and a feedback torque sensor signal;
combining at least two of; said tie-rod force signal, said road wheel position signal, said vehicle speed signal, said steering wheel position signal and said feedback torque sensor signal;
generating a steering wheel torque command signal based on said combining;
generating a road wheel command signal based on said combining;
generating a composite tie-rod force signal from said tie-rod force signal;
wherein said steering wheel torque command signal is responsive to said composite tie-rod force signal, said feedback torque sensor signal, said steering wheel position signal and said vehicle speed signal; and
wherein said road wheel command signal is responsive to said vehicle speed signal, said feedback torque sensor signal and said steering wheel position signal.

22. The method for steering a vehicle of claim 21 further comprising:
generating a desired damping command responsive to said feedback torque sensor signal, said steering wheel position signal and said vehicle speed signal;
combining said desired damping command and said composite tie-rod force signal producing a damping torque command signal.

23. The method for steering a vehicle of claim 22 wherein said desired damping command is responsive to a time rate of change of said steering wheel position signal.

24. The method for steering a vehicle of claim 22 further comprising:

compensating said damping torque command signal to configure spectral content of said damping torque command signal thereby generating a compensated torque command signal.

25. The method for steering a vehicle of claim 24 wherein said compensating includes frequency based filters configured to tailor sensed road feedback to an operator.

26. The method for steering a vehicle of claim 24 wherein said compensating includes frequency based filtering configured to maintain stability.

27. The method for steering a vehicle of claim 26 wherein said compensating includes frequency based filters configured to modify the spectral content of sensed road feedback to an operator.

28. The method for steering a vehicle of claim 21 further comprising:
generating said steering wheel torque command signal responsive to a combination of an assist torque command and a return torque command.

29. The method for steering a vehicle of claim 28 wherein
said assist torque command is responsive to said compensated torque command signal and said vehicle speed signal; and
said return torque command is responsive to said steering wheel position signal and said vehicle speed signal.

30. The method for steering a vehicle of claim 29 wherein said compensated torque command signal is an index to at least one assist look-up table and blends an output thereof to generate a blended value of an assist torque command.

31. The method for steering a vehicle of claim 30 wherein said output of said at least one assist look-up table is blended in a ratio dependent upon said vehicle speed signal.

32. The method for steering a vehicle of claim 29 wherein said steering wheel position signal is an index of at least one return look-up table and blends an output thereof to generate a return torque command signal.

33. The method for steering a vehicle of claim 32 wherein said output of said at least one return look-up table is blended in a ratio dependent upon said vehicle speed signal.

34. The method for steering a vehicle of claim 21 further comprising calculating and producing a variable steering ratio signal in response to said steering wheel position signal and said vehicle speed signal.

35. The method for steering a vehicle of claim 34 wherein said generating said road wheel command signal is in response to said steering wheel position signal, said feedback torque sensor signal, and said variable steering ratio signal.

36. The method for steering a vehicle of claim 35 further comprising:
calculating an Ackerman correction factor; and
modifying said road wheel command signal with said Ackerman correction factor to cause each wheel of said vehicle to track about a common center.

37. The method of steering a vehicle of claim 36 further comprising calculating and producing a position command signal.

38. The method of steering a vehicle of claim 37 further comprising calculating and producing a left and right road wheel command signal associated with said vehicle's left and right road wheel respectively.

39. The storage medium encoded with a machine-readable computer program code for steering a vehicle, said storage medium including instructions for causing a computer to implement a method comprising:
receiving a tie-rod force signal and a road wheel position signal;

receiving a vehicle speed signal;

receiving a steering wheel position signal and a feedback torque sensor signal;

combining at least two of; said tie-rod force signal, said road wheel position signal, said vehicle speed signal, said steering wheel position signal and said feedback torque sensor signal;

generating a steering wheel torque command signal based on said combining;

generating a road wheel command signal based on said combining;

generating a composite tie-rod force signal from said tie-rod force signal;

wherein said steering wheel torque command signal is responsive to said composite tie-rod force signal, said feedback torque sensor signal, said steering wheel position signal and said vehicle speed signal; and wherein said road wheel command signal is responsive to said vehicle speed signal, said feedback torque sensor signal and said steering wheel position signal.

40. The computer data signal for steering a vehicle, said computer data signal including instructions for causing a computer to implement a method comprising:

receiving a tie-rod force signal and a road wheel position signal;

receiving a vehicle speed signal;

receiving a steering wheel position signal and a feedback torque sensor signal;

combining at least two of; said tie-rod force signal, said road wheel position signal, said vehicle speed signal, said steering wheel position signal and said feedback torque sensor signal;

generating a steering wheel torque command signal based on said combining;

generating a road wheel command signal based on said combining;

generating a composite tie-rod force signal from said tie-rod force signal;

wherein said steering wheel torque command signal is responsive to said composite tie-rod force signal, said feedback torque sensor signal, said steering wheel position signal and said vehicle speed signal; and wherein said road wheel command signal is responsive to said vehicle speed signal, said feedback torque sensor signal and said steering wheel position signal.

41. The steer-by-wire control system of claim 1 wherein said steering wheel unit comprises a closed loop control system responsive to said steering wheel torque command signal and said feedback torque sensor signal.

42. The steer-by-wire control system of claim 1 wherein said steering wheel unit exhibits a bandwidth sufficient to facilitate said torque control unit maintaining stability of said steer-by-wire system.

43. The steer-by-wire control system of claim 1 wherein said steering wheel unit comprises a steering wheel control unit and a steering wheel plant dynamics unit.

44. The steer-by-wire control system of claim 43 wherein:

said steering wheel control unit is respnsive to said steeringsaid steering wheel torque command signal and said feedback torque sensor signal and generates a torque command signal;

said steering wheel plant dynamics unit is responsive to said torque command signal and provides a reaction torque in response thereto to an operator.

wherein said steering wheel plant dynamics unit comprises a motor configured to position a steering wheel thereby generating said reaction torque.

45. The steer-by-wire control system of claim 44 wherein said steering wheel control unit includes a frequency based compensator configured to characterize spectral content of said torque command signal to maintain stability of said steering wheel unit.

46. The steer-by-wire control system of claim 45 wherein said steering wheel control unit includes a frequency based compensator configured to characterize spectral content of said torque command signal to increase bandwidth of said steering wheel unit.

47. The steer-by-wire control system of claim 44 wherein said steering wheel control unit includes a frequency based compensator configured to characterize spectral content of said torque command signal to increase the bandwidth of said steering wheel unit.

48. The steer-by-wire control system of claim 47 wherein said steering wheel unit exhibits a bandwidth of at least one Hertz.

49. The steer-by-wire control system of claim 48 wherein said steering wheel unit exhibits a bandwidth of about ten Hertz.

50. The steer-by-wire control system of claim 44 wherein said steering wheel control unit includes a frequency based compensator configured to characterize spectral content of said torque command signal such that is said steering wheel unit exhibits a bandwidth sufficient to facilitate generation of a steering wheel torque command signal by said torque control unit to maintain stability of said steer-by-wire system.

51. The steer-by-wire control system of claim 1 wherein said road wheel unit comprises a road wheel control unit and a road wheel plant dynamics unit.

52. The steer-by-wire control system of claim 1 wherein said road wheel unit exhibits a bandwidth sufficient to facilitate said position control unit maintaining stability of said steer-by-wire system.

53. The steer-by-wire control system of claim 1 wherein said road wheel unit comprises a closed loop control system responsive to said road wheel command signal and a road wheel position signal from said road wheel position sensor.

54. The steer-by-wire control system of claim 53 wherein said road wheel unit comprises a road wheel control unit and a road wheel plant dynamics unit.

55. The steer-by-wire control system of claim 54 wherein:

said road wheel control unit is responsive to said road wheel command signal and a road wheel position signal and generates a position command signal;

said road wheel plant dynamics unit is responsive to said position command signal and provides a road wheel position in response thereto wherein said road wheel plant dynamics unit comprises a motor configured to position a road wheel.

56. The steer-by-wire control system of claim 55 wherein said road wheel control unit includes a frequency based compensator configured to characterize spectral content of said position command signal to maintain stability of said road wheel unit.

57. The steer-by-wire control system of claim 56 wherein said road wheel control unit includes a frequency based compensator configured to characterize spectral content of said position command signal to increase bandwidth of said road wheel unit.

58. The steer-by-wire control system of claim 55 wherein said road wheel control unit includes a frequency based compensator configured to characterize spectral content of said position command signal to increase the bandwidth of said road wheel unit.

59. The steer-by-wire control system of claim 58 wherein said road wheel unit exhibits a bandwidth of at least one Hertz.

60. The steer-by-wire control system of claim 59 wherein said road wheel unit exhibits a bandwidth of about ten Hertz.

61. The steer-by-wire control system of claim 55 wherein said road wheel control unit includes a frequency based compensator configured to characterize spectral content of said position command signal such that said road wheel unit exhibits a bandwidth sufficient to facilitate generation of a road wheel command signal by said position control unit to maintain stability of said steer-by-wire system.

62. The method for steering a vehicle of claim 21 further including generating a torque command signal in a steering wheel unit such that said steering wheel unit exhibits a bandwidth sufficient to facilitate a torque control unit generating said steering wheel torque command signal to facilitate maintaining stability of said steering.

63. The method for steering a vehicle of claim 21 wherein said steering wheel torque command signal and said feedback torque sensor signal are applied to steering wheel unit comprising a closed loop control system responsive thereto.

64. The method for steering a vehicle of claim 63 wherein said steering wheel unit comprises a steering wheel control unit and a steering wheel plant dynamics unit.

65. The method for steering a vehicle of claim 64 wherein:
said torque command signal is generated in a steering wheel control unit responsive to said steering wheel torque command signal and said feedback torque sensor signal and
said steering wheel plant dynamics unit is responsive to said torque command signal and provides a reaction torque in response thereto to an operator.
wherein said steering wheel plant dynamics unit comprises a motor configured to position a steering wheel thereby generating said reaction torque.

66. The method for steering a vehicle of claim 64 wherein said torque command signal is applied to frequency-based compensation to characterize spectral content of said torque command signal to maintain stability of said steering wheel unit.

67. The method for steering a vehicle of claim 66 wherein said torque command signal is applied to frequency-based compensation to characterize spectral content of said torque command signal to increase bandwidth of said steering wheel unit.

68. The method for steering a vehicle of claim 64 wherein said torque command signal is applied to frequency based compensation to characterize spectral content of said torque command signal to increase the bandwidth of said steering wheel unit.

69. The method for steering a vehicle of claim 68 wherein said steering wheel unit exhibits a bandwidth of at least one Hertz.

70. The method for steering a vehicle of claim 69 wherein said steering wheel unit exhibits a bandwidth of about ten Hertz.

71. The method for steering a vehicle of claim 65 further including generating a torque command signal in a steering wheel unit such that said steering wheel unit exhibits a bandwidth sufficient to facilitate a torque control unit generating said steering wheel torque command signal to facilitate maintaining stability said steering.

72. The method for steering a vehicle of claim 21 further including generating a position command signal in a road wheel unit such that said road wheel exhibits a bandwidth sufficient to facilitate a torque control unit generating said road wheel command signal to facilitate maintaining stability of said steering.

73. The method for steering a vehicle of claim 21 wherein said road wheel command signal and a road wheel position signal from a road wheel position sensor are applied to a road wheel unit comprising a closed loop control system responsive thereto.

74. The method for steering a vehicle of claim 73 wherein said road wheel unit comprises a road wheel control unit and a road wheel plant dynamics unit.

75. The method for steering a vehicle of claim 74 wherein:
said position command signal is generated in a road wheel control unit responsive to said road wheel command signal and a road wheel position signal;
said road wheel plant dynamics unit is responsive to said position command signal and provides a road wheel position in response thereto.
wherein said road wheel plant dynamics unit comprises a motor configured to position a road wheel.

76. The method for steering a vehicle of claim 74 wherein said position command signal is applied to a frequency-based compensation to characterize spectral content of said position command signal to maintain stability of said road wheel unit.

77. The method for steering a vehicle of claim 76 wherein said position command signal is applied to frequency-based compensation to characterize spectral content of said position command signal to increase bandwidth of said road wheel unit.

78. The method for steering a vehicle of claim 75 wherein said position command signal is applied to frequency-based compensation to characterize spectral content of said position command signal to increase bandwidth of said road wheel unit.

79. The method for steering a vehicle of claim 78 wherein said road wheel unit exhibits a bandwidth of at least one Hertz.

80. The method for steering a vehicle of claim 79 wherein said road wheel unit exhibits a bandwidth of about ten Hertz.

81. The method for steering a vehicle of claim 75 further including generating a position command signal in a road wheel control unit such that said road wheel unit exhibits a bandwidth sufficient to facilitate a position control unit generating said road wheel command signal to facilitate maintaining stability of said steering.

* * * * *

UNITED STATES PATENT AND TRADEMARK OFFICE
CERTIFICATE OF CORRECTION

PATENT NO. : 6,370,460 B1
DATED : April 9, 2002
INVENTOR(S) : Kaufmann et al.

It is certified that error appears in the above-identified patent and that said Letters Patent is hereby corrected as shown below:

<u>Title page,</u>
Item [56], References Cited, U.S. PATENT DOCUMENTS, delete "6,098,926" and insert therefor -- 6,098,296 --.

<u>Column 11,</u>
Line 61, delete "respnsive" and insert -- responsive --.
Line 62, before "steering wheel" delete -- steeringsaid --.

<u>Column 14,</u>
Line 9, after "road wheel" insert therefor -- unit --.

Signed and Sealed this

Twentieth Day of September, 2005

JON W. DUDAS
*Director of the United States Patent and Trademark Office*